(12) United States Patent
Benier

(10) Patent No.: US 9,897,470 B2
(45) Date of Patent: Feb. 20, 2018

(54) DEVICE FOR CHARACTERIZING A PHYSICAL PHENOMENON BY ABLATION OF AN OPTICAL FIBER WITH BRAGG GRATINGS HAVING A TOTAL FLUX OF REFLECTED RADIATION MEASUREMENT

(71) Applicant: Commissariat A L'Energie Atomique et Aux Energies Alternatives, Paris (FR)

(72) Inventor: Jacky Benier, Avrainville (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 44 days.

(21) Appl. No.: 15/107,264

(22) PCT Filed: Dec. 19, 2014

(86) PCT No.: PCT/FR2014/053470
§ 371 (c)(1),
(2) Date: Jun. 22, 2016

(87) PCT Pub. No.: WO2015/097383
PCT Pub. Date: Jul. 2, 2015

(65) Prior Publication Data
US 2016/0370206 A1     Dec. 22, 2016

(30) Foreign Application Priority Data
Dec. 24, 2013   (FR) ...................... 13 63568

(51) Int. Cl.
*G01D 5/353*       (2006.01)
*G01H 9/00*        (2006.01)
(Continued)

(52) U.S. Cl.
CPC ......... *G01D 5/35316* (2013.01); *G01H 9/004* (2013.01); *G01K 11/3206* (2013.01); *G01L 1/246* (2013.01)

(58) Field of Classification Search
CPC ............... G01D 5/35316; G01H 9/004; G01K 11/3206; G01L 1/246
(Continued)

(56) References Cited

U.S. PATENT DOCUMENTS 4,264,211 A  *  4/1981  Biggs .................... G01B 11/28
                                                            250/227.31
5,734,623 A       3/1998  Ruffa

OTHER PUBLICATIONS

Benterou, J. et al., "In-situ Continuous Detonation Velocity Measurements Using Fiber-optic Bragg Grating Sensors", Mar. 13, 2008, http://www.osti.gov/servlets/url/922780-OfBvMv/.
(Continued)

*Primary Examiner* — Que T Le
(74) *Attorney, Agent, or Firm* — Brinks Gilson & Lione

(57) ABSTRACT

A device for characterizing a physical phenomenon that includes at least one optical fiber with short Bragg gratings having constant spacing, at least one broad spectrum laser lighting source, an optical circulator and a photoelectric detector that is configured to measure a global flux of all the reflected radiation picked up at the output of the optical circulator, as a function of time. Further disclosed is a method of characterization in which the global flux of the signal is measured in such a way that a drop in the signal corresponds to the destruction of a Bragg grating.

15 Claims, 2 Drawing Sheets

(51) Int. Cl.
*G01L 1/24* (2006.01)
*G01K 11/32* (2006.01)

(58) Field of Classification Search
USPC .................................. 250/227.14, 227.18
See application file for complete search history.

(56) References Cited

OTHER PUBLICATIONS

Chen, Lun et al., "Fiber-optic sensors in explosion and detonation experiments", SPIE Newsroom, 2007.
Marcelo, M. et al., "A Guide to Fiber Bragg Grating Sensors" in: "Current Trends in Short and Long-period fiber Gratings", May 15, 2013, InTech, p. 4.
Rodriguez, G. et al., "Chirped fiber Bragg grating detonation velocity sensing", Review of Scientific Instruments, AIP, Melville, NY US, vol. 84, No. 1, Jan. 10, 2013, pp. 1-10.
Udd, Eric, et al., "Development of high speed fiber grating sensor solutions for measuring velocity, position, pressure and temperature", Proceedings of SPIE, vol. 8722, May 29, 2013, p. 872205.
Udd, Eric, et al., "Improvements to high-speed monitoring of events in extreme environments using fiber Bragg grating sensors", Fiber Optic Sensors and Applications IX, SPIE, 1000 29$^{th}$ St. Bellingham, WA 98225-6705, USA, vol. 8370, No. 1, May 11, 2012, pp. 1-13.
Van't Hof, P.G. et al., "Dynamic pressure measurement of shock waves in explosives by means of a fiber Bragg grating sensor", Proceedings of SPIE, vol. 6279, Jan. 26, 2007, pp. 62791Y-62791Y-7.
Anonymous "Fiber Bragg grating—Wikipedia, the free encyclopedia", Jul. 2, 2013, http://web.archive.org/web/20130702031995/http://enc.wikipedia.org/wiki/Fiber_Bragg_grating, p. 7.

* cited by examiner

DEVICE FOR CHARACTERIZING A PHYSICAL PHENOMENON BY ABLATION OF AN OPTICAL FIBER WITH BRAGG GRATINGS HAVING A TOTAL FLUX OF REFLECTED RADIATION MEASUREMENT

TECHNICAL FIELD

The present application concerns a device for characterizing a physical phenomenon.

More particularly it concerns a device for characterizing a physical phenomenon producing pressure on a fiber, able to lead, in certain cases, to ablation thereof, and/or able to lead to a modification of the reflective properties of reflectors inserted into the optical fiber, for example a fiber with Bragg gratings.

BACKGROUND

To detect temporally, that is to say at what time takes place, the passage of a physical phenomenon and to measure the propagation velocity thereof, a measuring device conventionally used is for example an electrical sensor generally named "printed circuit". Such a sensor comprises an electrical circuit which closes on the passage of a pressure wave. More specifically, such a sensor comprises copper tracks deposited on a substrate conventionally of Kapton®. On passage of a pressure wave, the track closes (which generates a short circuit) and thus delivers an electrical pulse of several tens of volts (via a pulse box) of which the temporal information is exploited. To be precise, knowing the position of each track, an average velocity of progression of the wave may then be computed. However, such a sensor is often sensitive to the amplitude of the pressure acting upon it and does not therefore always respond satisfactorily to weak action. It furthermore requires to be electrically supplied and may be sensitive to electromagnetic interference. Furthermore, the bulk of such a sensor is often such that it may present a constraint for implanting in a structure.

For approximately the last twenty years, devices for measuring physical phenomena increasingly often comprise an optical fiber sensor instead of an electrical sensor of the aforementioned type, which may be resistive or capacitive, for example to verify civil engineering infrastructures.

An optical fiber has the advantage of being insensitive to electromagnetic disturbance, of being relatively flexible and of low bulk (an optical fiber has a standard diameter of the order of approximately 250 µm at most). Furthermore, the sensor, an infrared light source and a detector may be situated several hundreds of meters away from each other since the optical fiber attenuates light around 1550 nm very little. To be precise, the attenuation is then of the order of approximately 0.2 dB/km.

Tests have for example been carried out with an optical fiber immersed in an explosive material (nitromethane). At the time of the explosion, a light beam injected into the fiber is reflected at a shock front which ablates the fiber. The measurement of the velocity or movement of the shock front is for example carried out using laser interferometry (for example using "LDI" velocity measurement, "LDI" standing for "Laser Doppler Interferometry", or "PDV" for "Photonic Doppler Velocimetry"). The average velocity can be measured with this technique but the spatial locating of the event in the optical fiber remains difficult to determine. Furthermore, this technique operates best if the fiber is immersed in the explosive to have a concentric and symmetrical attack on the fiber. The implementation is thus difficult to manage, in particular in solid material.

It thus became apparent that the sensor is too rigid and is also fragile since the active part is bare.

Among optical fiber-based sensors, sensors using optical fiber with Bragg gratings have been developed for the most part in the last few years.

The operation of such a sensor relies on a measurement of an offset between a wavelength of a reflected beam of light relative to the Bragg wavelength of the grating. This offset varies according to the temperature or according to a stress applied to the fiber.

For the purpose of measuring disturbances linked to temperature, stresses (pressure variations) or deformations on materials or structures, devices comprising optical sensors with a Bragg grating have been developed. More recently, these sensors have been used to measure the passage of a detonation wave, or of a fast physical phenomenon, that is to say of which the propagation velocity is of the order of at least approximately one hundred meters per second. However, it is still difficult, to locate the position of the shock front precisely (that is to say for example with uncertainty less than approximately 1 mm) in the fiber at a given time with such devices.

Furthermore, such a sensor is still difficult to integrate within a material and/or a structure to be acted on and it is difficult to calibrate.

Furthermore, an optical fiber with Bragg gratings operates with difficulty when acted on asymmetrically.

It is also difficult to manufacture a grating with a length greater than one meter approximately, whereas the use of an optical fiber with Bragg gratings generally aims to have a grating with the largest possible length to continuously measure the change of a phenomenon. By way of information, currently, Bragg gratings generally measure a few centimeters. Such gratings, which are as long as possible, are furthermore generally chirped in order to make it possible to study change in reflection losses according to the wavelength progressively as the grating is destroyed.

Furthermore, to analyze the optical signals of these sensors, signal analysis methods are based on spectral measurements, either with a scanning technique (movement of a tunable laser coupled with a photodiode) or with an optical spectrum analyzer coupled to a broad spectrum source. However, the use of such techniques is limited, in particular considering their temporal resolution; they are for example inadequate for signal emissions at intervals less than approximately 1 µs.

SUMMARY

The object of the present invention is to mitigate the aforementioned drawbacks, at least partly, and furthermore to lead to other advantages.

The object of the present application is more especially to improve the temporal responses of the existing fiber-based devices, in particular to detect a passage of a physical phenomenon and to measure a propagation velocity thereof.

To that end, according to a first aspect, there is provided a device for characterizing a physical phenomenon comprising:
  at least one optical fiber with Bragg gratings, for disposal transversely to a propagation front of a physical phenomenon to characterize and comprising a plurality of Bragg gratings between a first end and a second end, each Bragg grating being configured to reflect a narrow band of specific wavelengths associated with it, at least one broad-spectrum laser illumination source, configured to emit laser radiation containing wavelengths associated with the Bragg gratings, an optical circulator configured to transmit the laser radiation from the at least one laser source to the first end of the optical fiber and to capture the reflected radiation sent back by the Bragg gratings of the optical fiber with Bragg gratings by the first end, characterized in that each Bragg grating of the at least one optical fiber is short and of constant period with a period which is specific to it, and in that the device further comprises a photoelectric detector configured to measure as output from the optical circulator, as a function of time, a total flux of all the reflected radiation captured by the photoelectric detector.

"Total flux" here designates any quantity representing a total quantity of reflected radiation, expressed in watt.

An amplitude of the signal is thus proportional to the photometric flux.

When the device according to the invention is implemented, the passage of a wave, for example a shock wave, progressively destroys each of the Bragg gratings of the plurality of Bragg gratings of the optical fiber. It is thus possible to analyze any type of physical phenomenon whatever it be provided that the fiber is thus ablated.

The laser source is advantageously a broad spectrum laser source, that is to say configured to emit a spectrum with a width comprised between approximately 50 nm and approximately 150 nm, for example approximately 100 nm.

According to an advantageous example embodiment, the laser illumination source is of ASE type (ASE standing for "Amplified Spontaneous Emission").

The laser illumination source is for example configured to emit radiation with wavelengths in the visible or infrared spectrum, for example comprised between approximately 1530 nm and approximately 1580 nm.

Plurality here means that the optical fiber comprises at least two Bragg gratings, and preferably half a dozen or more, the number of gratings and the distance separating two consecutive gratings depending on the velocity resolution desired. According to a preferred embodiment, the optical fiber with Bragg gratings comprises nine Bragg gratings.

Furthermore, by "narrow band of wavelengths" it is meant here that a Bragg grating is configured to reflect a signal of spectral width comprised between approximately 1 nm and approximately 10 nm, or even between approximately 1 nm and approximately 5 nm, at −3 dB around a wavelength specific to it.

In the context of the present application, the intervals cited are to be understood as including their bounds.

Furthermore, by "specific" it is meant that each grating returns a narrow band of wavelengths different from the others, that is to say, for example, with spectral overlapping with another grating less than or equal to approximately 10% of the width of spectral band of the reflected light.

If all the gratings send back the same wavelength, the detector would record only the variations in flux of the last gratings (those physically closer to the detector) since the transmission by the gratings is approximately 10%; the last grating destroyed would thus have the highest amplitude. Thus, to refine the measurement, the at least one optical fiber for example has Bragg gratings of period, or even optionally length, different from each other.

Thus, the period of the Bragg gratings of the plurality of Bragg gratings is for example different from the others to reflect a specific wavelength of the radiation emitted by the laser source, taking into account for example the spectral emission amplitude of the source which is not constant over the whole spectrum. The length of each grating enables the amplitude of the reflected signal to be adapted to that of the signal emitted around the corresponding wavelength.

A wavelength reflected by each of the Bragg gratings of the plurality of Bragg gratings is for example at a distance of approximately 2 nm to 8 nm from the wavelength reflected by another Bragg grating.

Furthermore, each Bragg grating of the plurality of Bragg gratings is a Bragg grating with a constant period. According to an example embodiment, each Bragg grating has a period comprised between approximately 400 nm and approximately 600 nm, or even for example between approximately 470 and 540 nm, and is for example approximately 500 nm for one of the Bragg gratings of the plurality.

For example, each Bragg grating of the plurality of Bragg gratings is optionally apodized. Apodization makes it possible to obtain a smoothed spectral response by attenuating spectral rebounds of the reflected signal. In other words, apodization is analogous to a filter. A possible technique consists for example of modifying the amplitude of the index modulation in the fiber.

The period of each grating determines the reflected wavelength of the spectrum and the length of the grating determines its spectral width.

For example, the Bragg gratings of the plurality of Bragg gratings are configured to conjointly reflect wavelengths over part, or even substantially the whole, of the width of the radiation emitted by the at least one broad spectrum laser illumination source.

For example, each Bragg grating of the plurality of Bragg gratings comprises between approximately 200 and 6000 inscriptions.

Each Bragg grating of the plurality of Bragg gratings comprises a minimum of inscriptions, that is to say the least possible, to locate as best possible the response zone of the Bragg grating considered.

Lastly by "short" it is meant that each of the Bragg gratings of the plurality of Bragg gratings of the optical fiber has an inscription length as short as possible, for example less than or equal to approximately 3 mm, for example each Bragg grating of the plurality of Bragg gratings of the optical fiber has an inscription length comprised between approximately 0.05 mm and approximately 3 mm, for example approximately 1 mm, or even comprised between approximately 0.1 and approximately 0.2 mm. The shorter a grating, the better can be its location. In other words, to have the best possible location for a grating, each grating is preferably as short as possible.

The inscription length, as well as an exposure time to produce the inscriptions of each grating, determine in particular the extent of reflection and the reflected spectral width.

Furthermore, the size of the Bragg gratings is linked to the wavelengths of the induced radiation. The more the laser source is configured to emit wavelengths of short wavelengths, the more the length of the gratings may be reduced.

According to an advantageous embodiment, all the Bragg gratings of the plurality of Bragg gratings have a same length.

According to an advantageous embodiment, two consecutive Bragg gratings of the plurality of Bragg gratings are separated from each other by a distance for example comprised between approximately 5 mm and approximately 25 mm according to the length of each grating and the measurement resolution desired, for example approximately 10 mm, which corresponds to an uncertainty in the distance between two consecutive gratings of 0.1 mm, in particular an uncertainty of approximately 1%.

For example, two consecutive Bragg gratings of the plurality of Bragg gratings are separated from each other by a same distance, that is to say that the distances separating two consecutive Bragg gratings are all identical, the Bragg gratings are regularly disposed in the optical fiber.

The distance between two consecutive gratings is for example identified by the distance separating two consecutive peaks of reflection amplitude along the optical fiber.

Thus, according to an advantageous embodiment, two consecutive gratings are physically distinct in terms of inscription on the fiber, and in terms of reflected wavelengths (that is to say with overlap less than or equal to approximately 10% of the reflected light).

Progressively with the destruction of the Bragg gratings, the radiation received by the fiber is decreasingly reflected, that is to say that the amplitude of the overall flux of the reflected radiation decreases notably for each Bragg grating destroyed.

Attenuation of the reflected radiation, caused by the destruction of each grating on passage of a wave, is recorded with sufficient temporal accuracy, that is to say for example with a predetermined recording cadence comprised for example between approximately 0.1 ns and approximately 10 ns, for example approximately 1 ns. Generally, the recording frequency is to be adapted according to the velocity signal to be measured, it is generally of the order of twice the bandwidth of the detector.

Such a device is furthermore less sensitive, or even insensitive, to electromagnetic perturbations and/or to temperature variations.

The device according to the invention thus provides a greater reduction in bulk for an equivalent thickness to that of a fiber sensor of the prior art described earlier. Furthermore, it has a wider range of use, with in particular a sensitivity to low pressures of action, for example such as approximately ten kPa. Better sensitivity furthermore makes it possible to better perceive variations in amplitude of the signal for a given wavelength range.

Such a device is also adapted to operate when acted on asymmetrically. More particularly, the direction of the acting pressure has little importance on the response of the sensor, contrary to the action of pressure or destruction of inscriptions which causes attenuation of the reflected photometric signal.

According to an advantageous embodiment, the photoelectric detector is also configured to convert the overall flux of the reflected radiation measured as output from the optical circulator into an electrical signal.

And for example, the device further comprises a digitizer configured to record the electric signal output from the photoelectric detector at a predetermined recording cadence. The predetermined cadence is for example comprised between approximately $10^8$ and $10^{10}$ measurements per second, in particular an interval of time between the recorded points comprised between approximately 0.1 ns and 10 ns, for example approximately 1 ns. Advantageously, a sampling frequency corresponds to twice a bandwidth value of the detector. According to an advantageous example embodiment, the photoelectric detector comprises a bandwidth comprised between approximately 50 MHz and 5 GHz, for example equal to approximately 1 GHz, or even advantageously approximately 0.5 GHz.

The quality of the measurement is linked to the size of the grating and to the characteristics (sensitivity and temporal) of the photoelectric detector.

It is furthermore based in particular on accurately determining location of each of the Bragg gratings of the plurality of Bragg gratings inscribed in the optical fiber.

This location determination is for example verified in advance with a reflectometer, measuring for example the Rayleigh scattering; an associated measurement uncertainty is then generally comprised between approximately 30 µm and approximately 100 µm.

Optionally, to enhance the mechanical strength properties of the fiber, the optical fiber advantageously comprises a sleeve around at least one bared zone at which inscription of a Bragg grating has been carried out. More particularly, to perform marking of a Bragg grating, it is necessary to remove a protective coating of the optical fiber (for example of a polymer) at the location at which the marking must be carried out, and this may locally weaken the optical fiber.

Optionally, the device comprises several optical fibers with Bragg gratings each comprising a plurality of Bragg gratings configured to form a series of sensors, that is to say fibers with Bragg gratings.

Each optical fiber with Bragg gratings is then optionally associated with a different source, which for example emits in a different spectral band from the others.

The fibers are for example arranged in series and the detector receives for example all the radiation reflected by all the fibers.

According to another aspect, there is also provided a method of characterizing a physical phenomenon comprising the implantation of at least one optical fiber with Bragg gratings transversely to a propagation front of a physical phenomenon to characterize and comprising a plurality of Bragg gratings between a first end and a second end, each Bragg grating being configured to reflect a narrow band of specific wavelengths associated with it, and, on passage of a physical phenomenon leading to progressive ablation of the optical fiber comprising the plurality of Bragg gratings, the method comprising:

A step of emitting radiation by at least one laser illumination source in a broad band of wavelengths containing wavelengths associated with the Bragg gratings and a step of injecting this radiation into the optical fiber by said first end; and A step of capturing the radiation reflected by the Bragg gratings of said optical fiber with Bragg gratings;

characterized in that it further comprises a step of measuring by a photoelectric detector, as a function of time, a total flux of all the reflected radiation thus captured.

The method is advantageously implemented by the device comprising all or some of the features described above.

For example, the circulator transmits the laser radiation from the laser source to the first end of the optical fiber and captures the reflected radiation sent back by the Bragg gratings of the optical fiber with Bragg gratings by the first end, and, for example, directs it towards the photoelectric detector.

Furthermore, each Bragg grating of the at least one optical fiber is preferably short and of constant period with a period that is specific to it.

The method next also comprises a step of converting the overall flux of the reflected radiation into an electrical signal by the photoelectric detector. And for example it also comprises a step of digitization of the electrical signal at a predetermined cadence by a digitizer.

On passage of a wave for example, the Bragg gratings of the plurality of Bragg gratings of the optical fiber are successively destroyed. This leads to a local drop in the signal on a curve representing for example an amplitude of the signal against time.

A step of identifying at least one drop in overall amplitude of an electrical signal and of a date corresponding to said drop, expressing a destruction of a Bragg grating of the plurality of Bragg gratings of the optical fiber, is then possible and thus for example makes it possible to determine, for example by a computing step, a position of the wave front at a given time and/or to compute a velocity, average or instantaneous, of propagation of the wave front. This step is for example carried out by a computer.

In other words, processing the electrical signal enables the temporal information corresponding to the destruction of a Bragg grating to be located.

It is then possible to compute a velocity, average for example, of propagation of the physical phenomenon.

For this, it is advantageous to have precise knowledge of the location of each Bragg grating. It is also advantageous to precisely know the distance between two consecutive gratings of the plurality of Bragg gratings of the optical fiber.

To that end, the method possibly comprises a prior step of performing marking of at least a first inscription and a second inscription, at a distance comprised between approximately 400 nm and approximately 600 nm from the first inscription, or even for example between approximately 470 and approximately 540 nm, in the optical fiber by local modification of the index n of the optical fiber by a laser to produce at least one Bragg grating, for example using the phase mask method.

Each inscription will thus enable a small part of the incident light to be diffracted. It is thus preferable to have a minimum of inscriptions in the fiber, and the distance between two consecutive inscriptions thus determines the wavelength reflected by a Bragg grating.

For example, the prior step of marking comprises a step of producing approximately 200 to 6000 inscriptions, with a period comprised between approximately 400 nm and approximately 600 nm, or even for example between approximately 470 and 540 nm, over an inscription length that is as short as possible, for example less than or equal to approximately 3 mm, for example comprised between 0.05 mm and approximately 3 mm, for example approximately 1 mm, or even comprised between approximately 0.1 and approximately 0.2 mm.

This thus makes it possible to produce a short Bragg grating with a constant period. This step is for example repeated for each Bragg grating to create, with a different period to ensure the fact that each Bragg grating sends back a spectral domain that is specific to it.

This makes it possible to have a photometric signature without ambiguity.

Furthermore, each Bragg grating is for example produced at a distance comprised between approximately 5 mm and approximately 25 mm from another directly neighboring Bragg grating, according to the length of each grating and the measurement resolution desired, for example approximately 10 mm, which corresponds to an uncertainty of approximately 1% for a velocity of physical phenomenon of approximately 1000 m/s.

For example, two consecutive Bragg gratings of the plurality of Bragg gratings are separated from each other by a same distance.

The method also comprises for example a step of locating at least some of the Bragg gratings of the plurality of Bragg gratings by a reflectometer.

The location of a Bragg grating furthermore consists for example in spatially (or temporally) locating a maximum of a reflection peak of the Bragg grating.

For example, the step of locating at least some of the Bragg gratings of the plurality of Bragg gratings by a reflectometer comprises a step of measuring Rayleigh scattering.

BRIEF DESCRIPTION OF THE DRAWING

The invention, according to an example embodiment, will be well understood and its advantages will be clearer on reading the following detailed description, given by way of illustrative example that is in no way limiting, with reference to the accompanying drawings in which.

DETAILED DESCRIPTION

Figure 1:
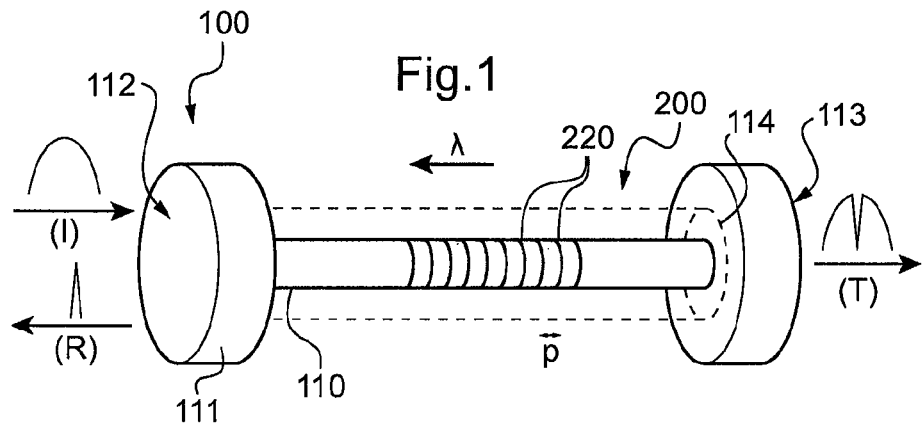
FIG. 1 shows a diagrammatic representation of a fiber with Bragg gratings with constant period of known type.
Figure 2:
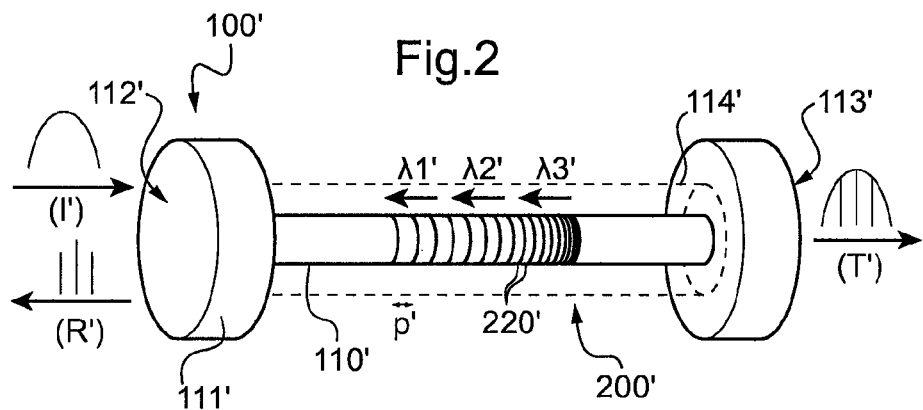
FIG. 2 shows a diagrammatic representation of a fiber with Bragg gratings with variable period of known type.

FIGS. 1 and 2 diagrammatically present an optical fiber 100 comprising a core 110, an optical sheath 114, also called "cladding" and which enables light to be conducted, and a mechanical sheath 111, also called "buffer coating", serving as a protective coating (the same numerical references to which a "prime" has been added designate the analogous parts on the embodiment of FIG. 2). The core 110 is characterized here by a refractive index denoted "n". The optical fiber 100 has a first end 112 and a second end 113. In the context of the present description, the first end 112 corresponds to an end of the fiber 100 by which light radiation arrives in the fiber 100 (in particular the incident radiation), and the second end 113 corresponds to an end of the fiber 100 by which the light radiation exits the fiber 100, that is to say after having passed through the fiber 100 (in particular the transmitted radiation).

The optical fiber 100 further comprises here a Bragg grating 200. The Bragg grating 200 comprises several interfaces, also here called inscriptions, or also index modulations, distant from each other by a period denoted "p", which is the characteristic period of the grating considered.

To produce Bragg gratings within an optical fiber, there is for example a method of photo-inscription of the fiber with an ultraviolet laser. The photo-inscription method uses for example a holographic method or a phase mask method. The index n of the fiber is thus modified periodically and permanently according to the light intensity of the photo-inscription laser to which the fiber is subjected.

The interfaces created thus compose a series of periodic modulations of refractive index n of the core of the fiber 100. The grating thus formed is characterized by a capacity to reflect a wavelength, which is characteristic of the grating, designated "Bragg wavelength", here denoted "$\lambda_B$" and which is a function of the period p of the grating inscribed in the fiber and of the index n of the fiber core according to the relationship: $\lambda_B = 2np$, at a reference temperature. For incident light radiation with a given spectrum in the fiber, part of the spectrum around the Bragg wavelength is thus reflected, whereas the rest is retransmitted. An optical fiber with Bragg gratings may thus be used for analysis in transmission and in reflection.

To a first approximation, there are two types of Bragg gratings: short-period gratings and long-period gratings. Short-period gratings are often called FBG for "Fiber Bragg Grating", while long-period gratings are often called LPG for "Long-Period Fiber". These two types of Bragg gratings may further be differentiated into two categories: gratings with constant period (see for example FIG. 1) and gratings with variable period, also referred to as "chirped" (see for example FIG. 2).

In the embodiment of FIG. 1, the period p is constant, that is to say that two consecutive interfaces 220 are all separated by the same distance, whereas in the embodiment of FIG. 2, the period p' is variable along the fiber. More particularly in the present example, the period p' decreases from the first end 112' towards the second end 113'.

In the case of the fiber of FIG. 1, for incident radiation (I) of a given spectrum, the reflected radiation (R) is thus radiation of wavelength $\lambda$ and the transmitted radiation (T) is then radiation of the same spectrum as the incident radiation (I) with part of the spectrum of wavelength $\lambda$ removed.

In the case of the fiber of FIG. 2, for an incident radiation (I') having a given spectrum, for example identical to that of FIG. 1, the reflected radiation (R') is then a radiation of wavelengths $\lambda 1'$, $\lambda 2'$ and $\lambda 3'$ for example, and the transmitted radiation (T') is then a radiation having the same spectrum as the incident radiation (I') with parts of the spectrum of wavelength $\lambda 1'$, $\lambda 2'$ and $\lambda 3'$ removed.

Thus, on use of an optical fiber with Bragg gratings within a measuring device, the passage of a wave, for example a shock wave, which is a compression wave, or more generally the application of a stress to the fiber, or a variation in the temperature (relative to the aforementioned reference temperature) causes the period of the grating to vary which thus has an incidence on the reflected wavelength or wavelengths. The analysis of the spectral response, that is to say the spectrum of the reflected or transmitted radiation, for example a frequency analysis of the radiation transmitted or reflected by the grating, provides information on the degree to which the optical fiber is acted upon.

In other words, the operation of a sensor comprising an optical fiber with Bragg gratings generally relies on the measurement of an offset of the wavelength or wavelengths of the grating, which vary according to the temperature and a stress applied to the optical fiber, relative to the Bragg wavelength or wavelengths which is or are characteristic of the grating at the reference temperature and in a state of rest.

To that end, it has conventionally been sought to produce the longest possible chirped Bragg gratings in order to be able to continuously study a change in the loss of reflected wavelengths when the fiber is ablated or type measure the wavelength offset when acted upon.

In the case of a spectral analysis, it would also be advantageous to be able to dissociate instances of being acted upon due to variations in temperature from those linked to variations in stresses or deformations.

Lastly, spectral analysis techniques are generally limited in particular due to their temporal resolution.

In the case of analysis of physical phenomena, these techniques are thus insufficient to have, for example, precise knowledge of a position of a wave front at a given time or of a propagation velocity of the front.

Figure 3:
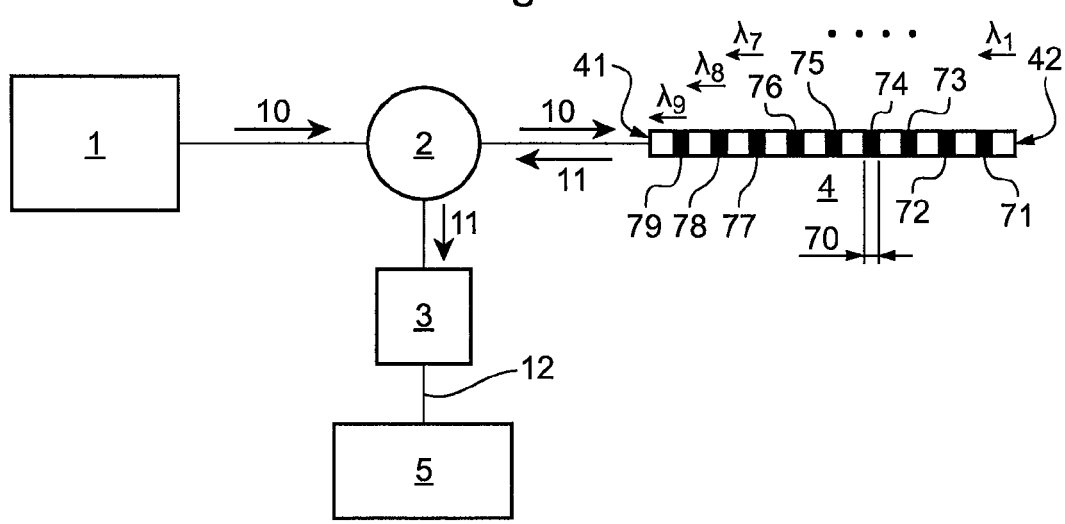
FIG. 3 presents a device according to an example embodiment of the present invention.

FIG. 3 is presents an embodiment of a device according to the invention.

The device comprises a laser illumination source 1.

The laser illumination source 1 is for example a broad spectrum laser illumination source, that is to say configured to emit for example radiation with a spectrum of width comprised between approximately 50 nm and approximately 150 nm, for example a width of approximately 100 nm. The laser illumination source is for example of ASE type (ASE standing for "Amplified Stimulated Emission"). It is configured to emit in a known spectral band. The radiation emitted by the laser illumination source 1 is for example around approximately 900 nm (for example between approximately 880 nm and approximately 930 nm), or 1300 nm (1250-1350 nm) or 1550 nm (1528-1564 nm) according to the dopant used. A notable advantage of a source emitting around 1550 nm is to have a very low attenuation of the signal, of the order of 0.2 dB per kilometer for example, for a silica fiber.

The laser illumination source 1 is for example here an amplified spontaneous emission source with fibers doped with Erbium with a power of 10 mW. The radiation emitted by the laser illumination source 1 is for example comprised between 1530 nm and 1580 nm in wavelength.

The radiation emitted by the laser illumination source 1, also here called induced radiation 10, is transmitted to an optical fiber 4 with Bragg gratings via an optical circulator 2.

The optical fiber 4 is for example an optical fiber which is a single mode fiber, for example of silica, of which the optical sheath (referred to as "cladding") measures approximately 80 µm, and has a core of diameter approximately 9 µm. It for example comprises here nine Bragg gratings, here identified by the numerical references 71 to 79. The optical fiber 4 for example has an index n of constant value. The index n of a silica fiber is for example approximately 1.4682 for incident radiation of approximately 1550 nm. Each of the Bragg gratings was inscribed in advance in the optical fiber 4 such that each Bragg grating is configured to reflect part of the induced radiation 10 that is different from that reflected by the other Bragg gratings. The Bragg wavelength of each of the gratings is diagrammatically indicated here by the references $\lambda 1$ to $\lambda 9$ in FIG. 3. The spectral offset is for example approximately at least 1 nm or even 5 nm to avoid any crosstalk.

For this, each Bragg grating is for example a Bragg grating of constant period, with the period of each Bragg grating being different from that of the other Bragg gratings. The period of each of the Bragg gratings is for example comprised between 521 nm to reflect a wavelength of approximately 1530 nm, and approximately 538 nm to reflect a wavelength of approximately 1580 nm.

The spectrum of each Bragg grating is for example here separated from its neighbors by approximately 2 nm to 8 nm, so as to avoid spectral band overlap between two consecutive Bragg gratings.

Each Bragg grating here also presents an inscription length 70 as short as possible, and is for example comprised between approximately 0.05 and approximately 3 mm. To be precise, the inscription length of a Bragg grating influences the response (temporal and in terms of amplitude as this is for example visible in FIG. 5 which is described later) of the optical fiber 4 with Bragg gratings, and thus an associated measurement uncertainty. However, tests have revealed that an inscription length of approximately one millimeter already gives satisfactory measurement results.

Generally, a compromise is to be found between the inscription length of a Bragg grating and its reflection capacity, that is to say the variation in index corresponding to an interface of the grating and the number of interfaces in each grating.

In the present example, it is considered that each grating, with an inscription length of 1 mm, has a spectral width of approximately 2 nm at −3 dB.

Thus all the Bragg gratings of the optical fiber 4 are configured to cover a spectral band between 1530 nm and 1580 nm, in relation with the spectral source of emission of the laser source 1. Their spectral distribution is for example centered on the following wavelengths: 1535 nm, 1540 nm, 1545 nm, 1550 nm, 1555 nm, 1560 nm, 1565 nm, 1570 nm, 1575 nm. The reflected spectrum of each Bragg grating would then for example be separated from its neighbors (in terms of wavelength) by approximately 3 nm, considering a width of 2 nm of the reflected spectrum. The spectral position of the gratings inscribed in the fiber may possibly be arbitrary since it is not required to analyze the spectral response but a change in the overall flux of the reflected signal. Thus the arrangement of the Bragg gratings in the fiber may be chosen as a function of their degree of reflection (depending on the wavelength of the source, the amplitude and the spectral width reflected). The gratings presenting a high degree of reflection are thus for example disposed preferably far from a detector 3, in other words, near the end 42.

As mentioned earlier, the optical circulator 2 is configured to transmit the radiation emitted by the laser illumination source 1 to the optical fiber 4. The induced radiation 10 enters the optical fiber 4 by a first end 41 of the optical fiber 4 and is successively reflected by all the Bragg gratings contained by the optical fiber 4. Radiation referred to as reflected radiation 11, then propagates from the optical fiber 4 to a photoelectric detector 3 via the optical circulator 2. As a matter of fact, the optical circulator 2 is configured both to transmit the radiation of the laser illumination source as well as to separate the induced radiation 10 from the reflected radiation 11.

The photoelectric detector 3 is also configured here to convert the reflected radiation 11 into an electrical signal 12.

The photoelectric detector 3 is for example a photoelectric detector with a bandwidth of approximately at least 1 GHz, which will define the temporal resolution of the device.

A digitizer 5, positioned here at the output from the photoelectric detector 3, is configured to record the electrical signal 12 at the output from the photoelectric detector 3 at a predetermined recording cadence, for example every 0.5 ns.

An amplitude of the electrical signal 12 at each instant is thus known.

After these measurements, signal processing makes it possible to precisely determine the spatial location of each temporal event detected and/or to compute a propagation velocity of a physical phenomenon.

For this, the accurate knowledge of a distance between two consecutive gratings, for example by virtue of measurements with a reflectometer prior to experiment, makes it possible compute an average propagation velocity of the physical phenomenon studied.

An advantageous reflectometer for performing position measurements of each grating and/or of distance between two consecutive gratings (measurement of the reflectivity of each grating) is for example a reflectometer of OBR™ type (OBR standing for Optical Backscatter Reflectometer™) of the company Luna Technologies. Such a reflectometer makes it possible to analyze the Rayleigh scattering of the fiber.

Figure 4:
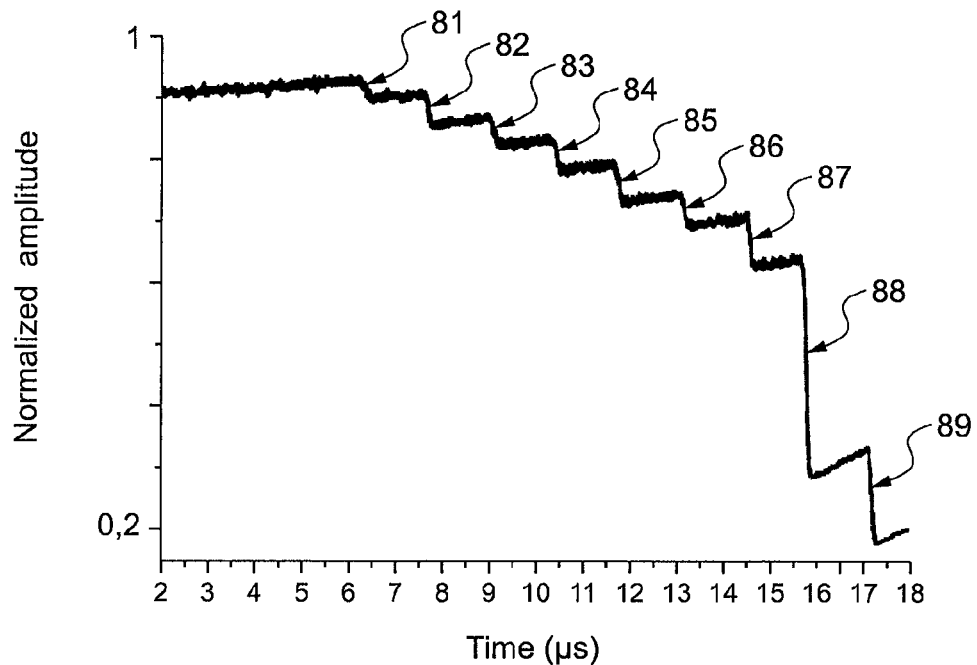
FIG. 4 shows an example of temporal response of an optical fiber with nine Bragg gratings with each grating having a length of 1 mm.

FIG. 4 presents an example of a result, for a fiber with Bragg gratings immersed in nitromethane (which is a liquid explosive), obtained with an amplified spontaneous emission laser source 1 with fibers doped with Erbium of 10 mW power, and with an optical fiber 4 of 80 μm core diameter comprising a series of nine Bragg gratings, each of constant period comprised between approximately 521 nm and approximately 538 nm for each grating, of inscription length 1 mm with a spectral width of approximately 2 nm at −3 dB, and of which the spectrum of each grating (identified earlier by the references $\lambda 1$ to $\lambda 9$ in the present example embodiment) is separated spectrally from that of its neighbours by approximately 2 nm to 8 nm. Two consecutive gratings are furthermore separated from each other by approximately 9 mm.

Thus, the graph of FIG. 4 shows a curve representing a change in amplitude of the signal acquired at the digitizer 5 as a function of time (in microseconds). It appears that the curve comprises nine falls or weakening, here indicated by the references 81 to 89. The maximum amplitude of the signal is for example here of the order of 225 mV.

This shows that on passage of a detonation wave, the optical fiber is progressively destroyed. At each ablation of a Bragg grating, the signal is lessened, that is to say the reflection of the induced radiation in the fiber drops.

The photoelectric detector 3 records a succession of weakenings.

Temporal location of a signal drop with accurate knowledge of the position of the corresponding grating thus makes it possible to determine a propagation velocity of a detonation wave.

Thus for example, here, the induced radiation arrives in the optical fiber 4 by the first end 41 whereas the shock wave propagates from a second end 42 of the optical fiber 4 (indicated in FIG. 3). It is thus the first Bragg grating here numbered 71 which is destroyed first, then the second Bragg grating and so forth until the ninth Bragg grating here numbered 79. When the first Bragg grating 71 is destroyed, the amplitude of the signal drops according to weakening 81 and so forth until the destruction of the ninth grating 79 to which corresponds the weakening 89.

Figure 5:
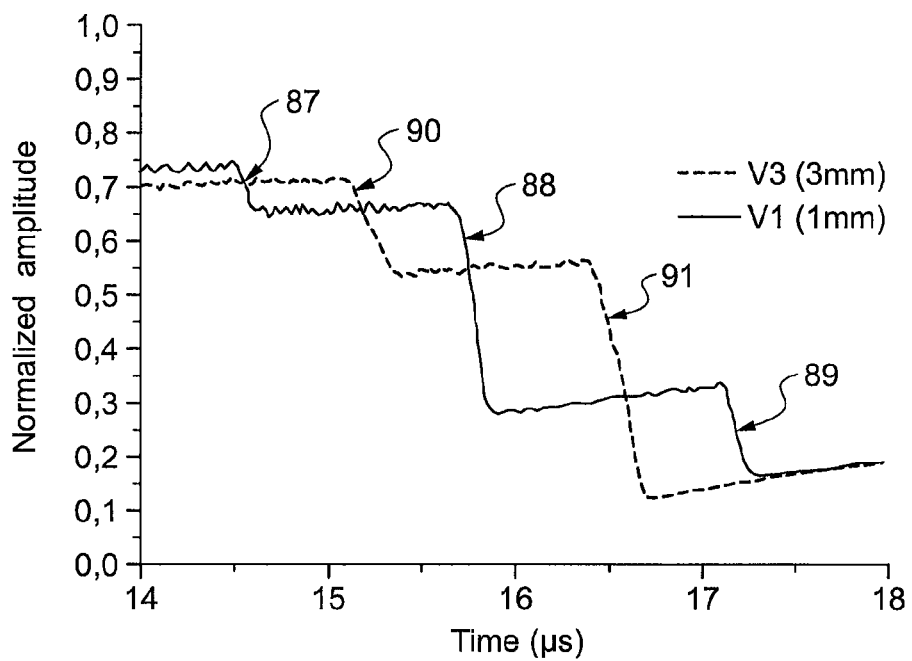
FIG. 5 presents an example of temporal response for an optical fiber of which each Bragg grating has a length of 1 mm compared with a temporal response for an optical fiber of which each Bragg grating has a length of 3 mm.

FIG. 5 presents a graph which shows a detail of the curve of FIG. 4 and compares it to that of a same test carried out with an optical fiber with nine Bragg gratings too, of which each grating has a length of 3 mm. The 1 mm gratings are separated by 9 mm and those of 3 mm are separated by 7 mm. Considering the middle of each grating as a reference, the distance is equivalent to 10 mm. The curve which corresponds to the test of which the Bragg gratings of the optical fiber measure 1 mm is identified by reference V1 in continuous line, and the curve which corresponds to the test of which the Bragg gratings of the optical fiber measure 3 mm is identified by the reference V3 in dashed line.

Curve V3 makes it possible to better show a slope present each time the curve sinks. This slope is directly linked to the length of inscription of each grating. This is because, during its progressive destruction, each grating reflects increasingly less radiation. The shorter the inscription length, the more the destruction of the grating will appear on a curve as corresponding to an instantaneous event. Thus for example, the weakening 88 will have a duration of approximately 144 ns and the weakening 89 a duration of approximately 151 ns; whereas a weakening identified by the reference 90 would have a duration of approximately 251 ns and a weakening identified by the reference 91 would have a duration of approximately 276 ns. It is for example possible to consider that the location of the event is made as soon as the decrease in the signal corresponding to the spatial position of the reflection maximum of the grating (determined with the reflectometer).

Naturally, the present invention is limited neither to the preceding description nor to the appended drawings, but encompasses any variant form within the capability of the person skilled in the art.

The invention claimed is:

1. A device for characterizing a physical phenomenon comprising:
   at least one optical fiber with Bragg gratings, for disposal transversely to a propagation front of a physical phenomenon and comprising a plurality of Bragg gratings between a first end and a second end, each Bragg grating configured to reflect a narrow band of specific wavelengths associated with the Bragg grating;
   at least one broad-spectrum laser illumination source, configured to emit laser radiation containing wavelengths associated with the Bragg gratings,
   an optical circulator configured to transmit the laser radiation from the at least one laser source to the first end of the optical fiber and to capture the reflected radiation sent back by the Bragg gratings of the optical fiber with Bragg gratings by the first end,
   wherein each Bragg grating of the at least one optical fiber is short and of constant period with a period that is specific to each Bragg grating, and wherein the device further comprises a photoelectric detector configured to measure a total flux of all the reflected radiation captured by the photoelectric detector as output from the optical circulator, and as a function of time.

2. The device according to claim 1, wherein each Bragg grating of the plurality of Bragg gratings of the optical fiber has an inscription length comprised between approximately 0.05 and approximately 3 mm.

3. The A-device according to claim 1, wherein the Bragg gratings of the plurality of Bragg gratings are configured to conjointly reflect wavelengths over substantially the whole of the width of the radiation emitted by the at least one broad spectrum laser illumination source.

4. The device according to claim 1, wherein each Bragg grating of the plurality of Bragg gratings comprises between approximately 200 and 6000 inscriptions.

5. The device according to claim 1, wherein two consecutive Bragg gratings of the plurality of Bragg gratings are separated from each other by a distance comprised between approximately 5 mm and approximately 25 mm.

6. The device according to claim 1, wherein two consecutive Bragg gratings of the plurality of Bragg gratings are separated from each other by a same distance.

7. The device according to claim 1, wherein each Bragg grating has a period comprised between approximately 400 nm and approximately 600 nm.

8. The device according to claim 1, wherein each Bragg grating of the plurality of Bragg gratings is configured to reflect a signal of spectral width comprised between approximately 1 nm and approximately 10 nm at −3 dB around a wavelength specific to the Bragg grating.

9. The device according to claim 1, wherein each Bragg grating of the plurality of Bragg gratings reflects a wavelength at a distance of approximately 2 nm to 8 nm from the wavelength reflected by another Bragg grating.

10. The device according to claim 1, wherein each Bragg grating of the plurality of Bragg gratings is apodized.

11. The device according to claim 1, further comprising several optical fibers with Bragg gratings each comprising a plurality of Bragg gratings configured to define a series of sensors.

12. The device according to claim 1, wherein the at least one optical fiber is single mode.

13. A method of characterizing a physical phenomenon, the method comprising:
    implanting at least one optical fiber with Bragg gratings transversely to a propagation front of a physical phenomenon and comprising a plurality of Bragg gratings between a first end and a second end, each Bragg grating configured to reflect a narrow band of specific wavelengths associated with it, and, on passage of a physical phenomenon leading to progressive ablation of the optical fiber comprising the plurality of Bragg gratings, the method further comprising:
       emitting radiation by at least one laser illumination source in a broad band of wavelengths containing wavelengths associated with the Bragg gratings and injecting the radiation into the at least on optical fiber by the first end; and
       capturing the radiation reflected by the Bragg gratings of the optical fiber with the Bragg gratings; and
       measuring a total flux of all the reflected radiation thus captured by a photoelectric detector as a function of time.

14. The method according to claim 13 further comprising identifying at least one drop in overall amplitude of an electrical signal and of a date corresponding to the drop, expressing a destruction of a Bragg grating of the plurality of Bragg gratings of the optical fiber.

15. The method according to claim 13, further comprising computing a position of the wave front at a given time and/or a velocity of propagation of the wave front.

* * * * *